Feb. 7, 1967    D. E. DAVIDSON    3,302,512
OPTICAL INSTRUMENT FOR MEASURING RELATIVE ANGULAR
DISPLACEMENT OF TWO OBJECTS ABOUT A TWIST AXIS
Filed Feb. 19, 1963    2 Sheets-Sheet 1
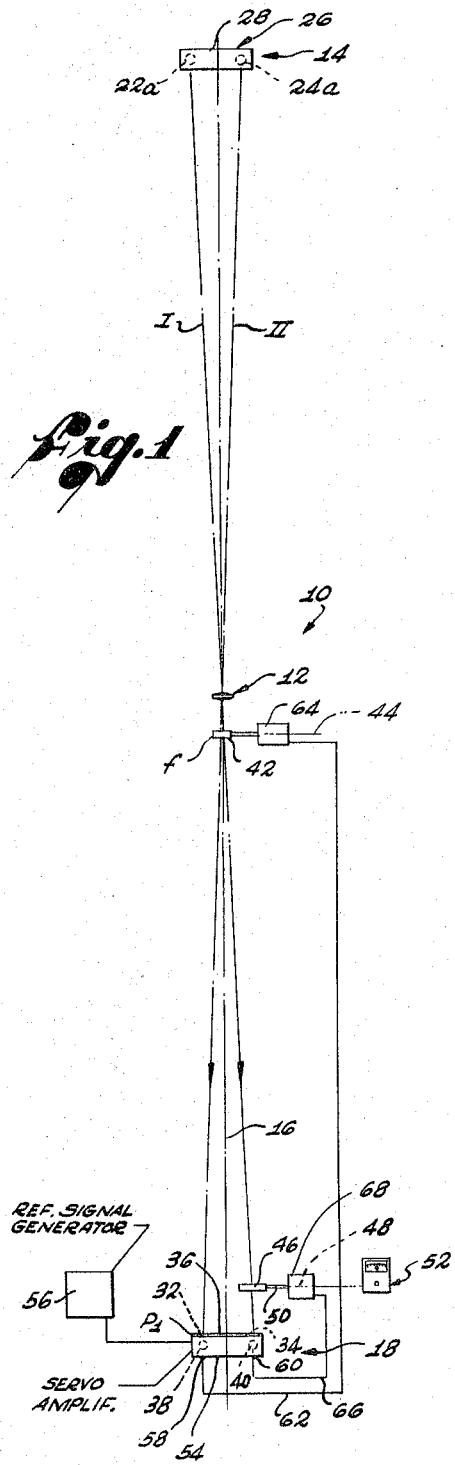
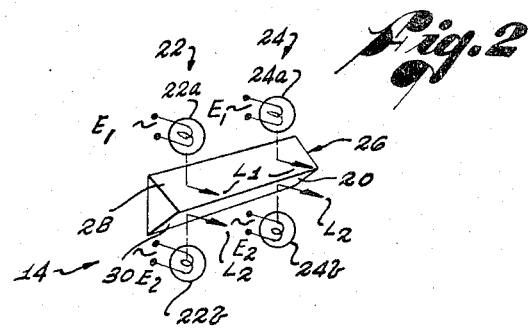
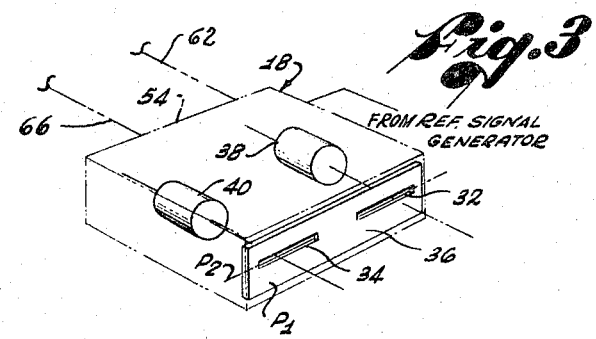
INVENTOR.
DONALD E. DAVIDSON
BY Forrest J. Lilly
ATTORNEY

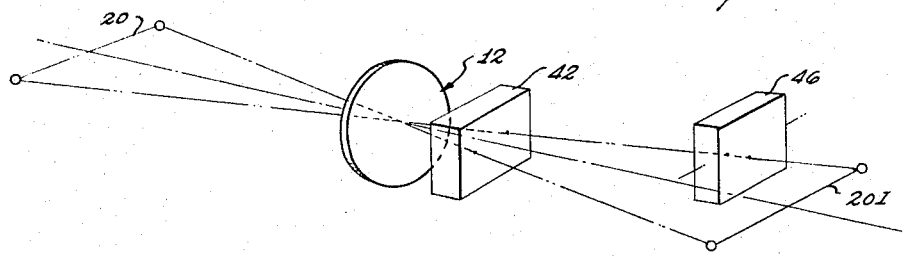
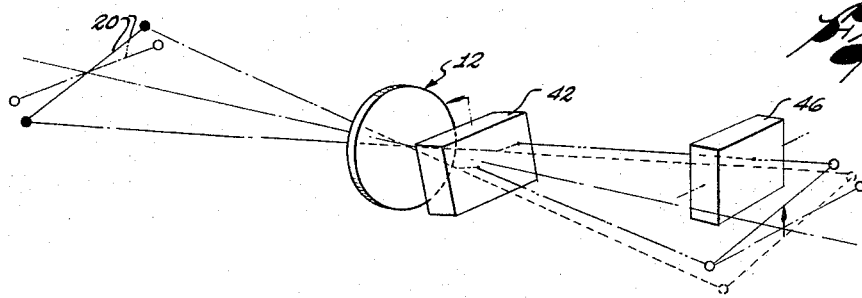
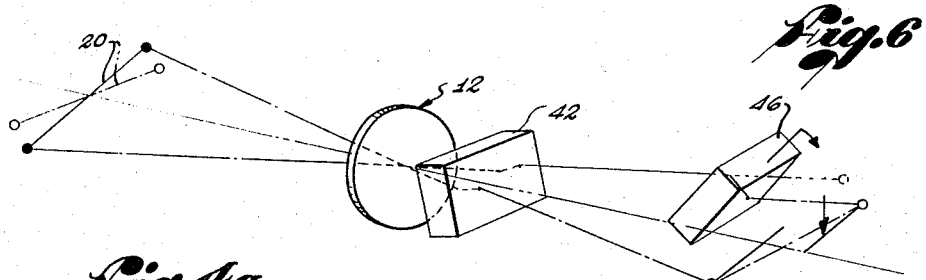
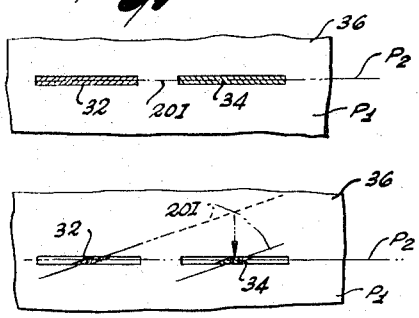
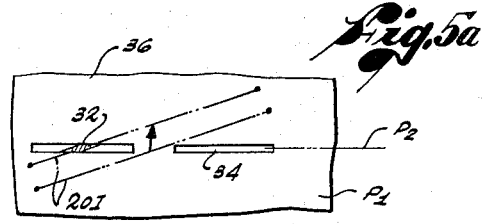

United States Patent Office  3,302,512
Patented Feb. 7, 1967

3,302,512
OPTICAL INSTRUMENT FOR MEASURING RELATIVE ANGULAR DISPLACEMENT OF TWO OBJECTS ABOUT A TWIST AXIS
Donald E. Davidson, La Habra, Calif., assignor to Davidson Optronics, Inc., West Covina, Calif., a corporation of California
Filed Feb. 19, 1963, Ser. No. 259,648
9 Claims. (Cl. 88—14)

This invention reates generally to the art of optical measurement and, more particularly, to an optical method of and instrument for detecting or measuring relative angular displacement, or twist, of two objects situated along the twist axis.

A problem which is frequently encountered in many fields of present-day technology is detecting or measuring, with a high degree of precision and accuracy, relative angular displacement, that is, relative angular motion or the relative angular position, of two objects situated along the axis of rotation. This basic problem of mensuration, while difficult enough in itself to accomplish with the very high degree of precision and accuracy required in many cases, is often complicated by the fact that the distance between the objects to be measured is relatively great. In some cases, for example, it may be necessary to measure the relative angular displacement of two objects located 50 to 100 feet, or more, apart.

A general object of the present invention is to provide an optical method of and instrument for measuring, with a high degree of precision and accuracy, relative angular displacements of the kind described.

Another object of the invention is to provide an optical measuring instrument of the character described which is automatic in operation.

A further object of the invention is to provide an optical measuring instrument and a method of optical measurement for the purpose described which are relatively simple, economical to manufacture and practice, and otherwise ideally suited to their intended purposes.

Other objects, advantages, and features of the invention will become readily evident to those skilled in the art as the description proceeds.

Briefly, the objects of the invention are attained by providing an optical measuring instrument and an optical method of measurement wherein light rays from a light transmitter situated on the optic axis of an optical objective are transmitted through the objective to a light receiver situated on the axis. In practice, the transmitter and receiver may be located a substantial distance apart, such as 50 to 100 feet or more. The light transmitter has a pair of light sources and light transmission means for transmitting light rays from one source to the objective at one side of an optic plane parallel to the optic axis and transmitting light rays from the other source to the objective at the opposite side of this plane. Accordingly, the optic plane defines a boundary between the light rays from the two light sources and, for this reason, is hereinafter referred to as a boundary plane. The light transmitter also has a fine linear element which extends transversely of the optic axis within the boundary plane to define or demark this plane at the light transmitted. This element is hereinafter referred to as a boundary element. The optical objective is focused to produce a sharp image of this boundary element in an image plane transversed to the optic axis. This image is hereinafter referred to as a boundary image.

One light source of the light transmitter emits characteristic light of one kind and the other light source emits characteristic light of another kind. The light from these sources are characterized by distinct or dissimilar detectable qualities which distinguish the light of one source from the light of the other source. In the illustrated embodiment of the invention, for example, the intensities of the two light sources fluctuate in 180° out-of-phase relation so that the maximum and minimum intensity levels of the light from one source occur approximately simultaneously with the minimum and maximum intensity levels, respectively, of the light from the other source. These out-of-phase fluctuating intensities of the light from the two light sources of the light transmitter, then, constitute distinct or dissimilar qualities which distinguish the light of one source from the light of the other source.

It is evident at this point, therefore, that characteristic light of one kind from one light source of the light transmitter arrives at the image plane of the present optical measuring instrument at one side of the optical boundary image which is produced in this plane. Characteristic light of another kind from the other light source arrives at this image plane at the opposite side of the boundary image.

The light receiver comprises a photoelectric transducer having two similar narrow photosensitive areas located in the image plane, adjacent the intersection of the latter plane and an optic plane parallel to the objective axis. Included in the transducer are means responsive to the characteristic light of the two different kinds from the two light sources of the light transmitter for sensing the characteristic light incident on each sensitive area of the transducer and generating an output signal related to the incident light.

In a typical use of the instrument, the light transmitter and receiver are coupled to two objects, respectively, whose relative angular position or angular displacement is to be measured or monitored, whereby the relative angular positions of the light transmitter and receiver, and hence the relative angular positions of the boundary image and sensitive areas of the receiver, are related to the relative angular positions of the objects being monitored. In one relative angular position of the light transmitter and receiver, hereinafter referred to as their aligned position, the boundary image bisects both sensitive areas. Under these conditions, each area receives equal amounts of light of the two different kinds emitted by the light transmitter. This position of the image relative to the sensitive areas of the receiver is hereinafter referred to as its centered position.

If the light transmitter and receiver are relatively rotated from their aligned position the boundary image will be relatively angularly displaced from its centered position on the sensitive areas of the receiver. Under these conditions, each area receives a preponderance of characteristic light of one kind from one light source of the light transmitter, the angular displacement its centered position is related to the relative angular displacement of the light transmitter and receiver and, accordingly, to the angular displacement of the objects whose relative angular position is being monitored.

According to the invention, the angular displacement of the boundary image from its centered position is measured, to obtain the relative angular displacement of the light transmitter and receiver, by first translating the entire image to a position in which one end of the image bisects its respective sensitive area of the receiver and then translating the other end of the image to a position in which it bisects its respective sensitive area of the receiver. The distance through which the latter end of the image must be thus displaced is related to the angular displacement of the image and hence the angular displacement of the light transmitter and receiver.

In the present invention, the boundary image is translated or displaced, as described above, by optical light deflecting means which are positioned automatically in response to the output signals from the light receiver in such manner as to maintain the ends of the image centered on the sensitive areas of the light receiver. The position of one of these light deflecting means furnishes a readout related to the angular displacement of the light transmitter and receiver.

A better understanding of the invention may be had from the following detailed description thereof, taken in connection with the annexed drawings, wherein:

FIG. 1 diagrammatically illustrates the present optical measuring instrument;

FIG. 2 is an enlarged diagrammatic illustration, in perspective, of the light transmitter in the instrument of FIG. 1;

FIG. 3 is an enlarged diagrammatic illustration, in perspective, of the light receiver in the instrument of FIG. 1;

FIGS. 4, 5 and 6 schematically illustrate the operation of the instrument of FIG. 1; and FIGS. 4a, 5a and 6a illustrate the positions occupied by the boundary image when the instrument is in its operative positions of FIGS. 4, 5 and 6, respectively.

The optical instrument 10 illustrated in these drawings is equipped with an optical objective 12, a light transmitter 14 located along the optic axis 16 of the objective, at one side of the latter, and a light receiver 18 located along the optic axis 16 at the opposite side of the objective 12. As noted earlier, the light transmitter 14 and receiver 18 may be located a substantial distance apart along the axis 16. In some applications for which the present measuring instrument is designed, for example, this distance may be on the order of 50 to 100 feet, or more.

The light transmitter 14 emits toward the objective 12 characteristic light $L_1$, of one kind at one side of a boundary plane parallel to the optic axis 16 and characteristic light $L_2$ of another kind at the opposite side of this plane. This light passes through the optical objective 12 to the receiver 18. Included in the light transmitter 14 is a fine linear boundary element 20 which extends transversely of the optic axis 16, within the boundary plane, and forms a demarcation or seperation at the light transmitter between the emitted rays of characteristic light $L_1$ and the emitted rays of characteristic light $L_2$. Thus, the optical objective 12 receives the characteristic light $L_1$ from one side of the boundary element 20 and the characteristic light $L_2$ from the opposite side of this element. The objective 12 is focused to produce an optical boundary image of the element 20 in a focal or image plane $P_1$ transverse to the optic axis 16 at the light receiver 18.

The particular light transmitter 14 illustrated in the drawings has two lamp pairs 22 and 24 located at opposite sides of the optic axis 16. Lamp pair 22 is made up of two lamps 22a and 22b. Similarly, lamp pair 24 is made up of two lamps 24a and 24b. The lamps 22a, 24a together constitute one light source which emits the characteristic light $L_1$ and the lamps 22b, 24b together constitute a second light source which emits the characteristic light $L_2$. As noted earlier, the light $L_1$ and the light $L_2$ are characterized by distinct or dissimilar detectable characteristic qualities, namely, out-of-phase fluctuating intensities. To this end, the lamps 22a and 24a of the light transmitter are energized from a common A.-C. power supply $E_1$ so that the light intensities of these lamps fluctuate in unison or in phase between maximum and minimum intensity levels in such a way that the maximum intensity levels, as well as the minimum intensity levels, of the lamps occur simultaneously. Similarly, the two lamps 22b, 24b of the light transmitter are energized from a common A.-C. power supply $E_2$. Accordingly, the intensities of the lamps 22b, 24b fluctuate in unison or in phase between maximum and minimum intensity levels in such a way that the maximum intensity levels as well as the minimum intensity levels of the latter lamps occur simultaneously. The alternating current from the power supply $E_2$, however, is 180° out-of-phase with the alternating current from the power supply $E_1$. Accordingly, the maximum and minimum intensity levels of the lamps 22a, 24a occur simultaneously with the minimum and maximum intensity levels, respectively, of the lamps 22b, 24b.

Situated between the lamps 22a, 24a and the lamps 22b, 24b are light transmission means in the form of an optical prism 26. This prism has reflecting faces 28 and 30 which are convergent in the direction of the light receiver 18 and intersect along an apex edge which defines the boundary element 20. This apex edge, or boundary element, is located approximately in a plane, referred to herein as a boundary plane, containing the optical axis 16 of the objective 12 and extends substantially normal to the axis. The upper reflecting face 28 of the prism 26 is oriented so that light rays from lamp 22a are reflected through the objective 12 to the receiver 18 along an optical path I and light rays from the lamp 24a are reflected through the objective 12 to the receiver 18 along an optical path II. Similarly, the reflecting face 30 of the prism 26 is oriented so that light rays from the lamp 22b are reflected through the objective to the receiver along the optical path I and light rays from the lamp 24b are reflected through the objective to the receiver along the optical path II.

From this description, it is evident that the optical objective 12 receives the characteristic light $L_1$, emitted by lamps 22a and 24a, from one side of the boundary element 20. Similarly, the objective 12 receives the characteristic light $L_2$, emitted from the lamps 22b and 24b, from the opposite side of the element 20. The apex edge, or boundary element, 20 of the prism 26 is focused in the image plane $P_1$ at the receiver 18, as already noted.

Receiver 18 comprises a photoelectric transducer having two narrow photosensitive areas 32 and 34. These areas are located at opposite sides of the optic axis 16, along the intersection of a common optic plane $P_2$ containing the optic axis and the image plane $P_1$, to receive the optical image 20I, herein referred to as a boundary image, of the boundary element 20. The sensitive areas 32 and 34 are so positioned that when the objective 12, light transmitter 14, and light receiver 18 are accurately aligned, the boundary image 20I is located in the optic plane $P_2$ and thus occupies its centered position on and bisects both sensitive areas, as shown in FIG. 4a in one relative angular position, herein referred to as the aligned position, of the transmitter and receiver about the axis 16. In this latter figure, it will be observed that when the image 20I is thus accurately aligned with the sensitive areas 32 and 34, one end of the image is centered on the area 32 and the other end of the image is centered on the area 34.

In the particular light receiver 18 illustrated, the photosensitive areas 32 and 34 comprise narrow, transparent slits in an otherwise opaque plate or mask 36. This mask is disposed in the image plane $P_1$. Situated directly behind the transparent slit, or photosensitive area, 32, is a photosensitive means 38, preferably comprising a photomultiplier tube. Similarly, a photosensitive means 40, also preferably comprising a photomultiplier tube, is situated directly behind the transparent slit, or photosensitive area, 34. It is evident, therefore, that any light rays from the light transmitter 14 which are incident on the slits or photosensitive areas 32 and 34 are transmitted through the latter to the respective photocells 38 and 40.

As noted above, if the light transmitter 14 and light receiver 18 occupy their aligned position, the boundary image 20I falls directly on and bisects the photosensitive areas 32 and 34 of the receiver. Light $L_1$ from the lamps 22a and 24a, of course, arrives at the image plane $P_1$ at one side of the image 20I and light $L_2$, from the lamps 22b and 24b, arrives at the image plane at the opposite side of the image. Accordingly, when the image 20I is accurately centered on the sensitive areas 32 and 34 of the receiver 18, as it is in FIG. 4a, each of these areas receives equal amounts of light of the two different kinds.

Assume now that the light transmitter 14 and the light receiver 18 are relatively angularly displaced or rotated slightly about the optic axis 16 of the objective 12. This relative angular displacement produces a corresponding relative angular displacement of the boundary image 20I out of the optic plane $P_2$ and from its centered position on the sensitive areas 32 and 34. Under these conditions, each of the sensitive areas receives a preponderance of light $L_1$ or $L_2$, depending upon the direction of the relative angular displacement. It is obvious that this relative angular displacement of the image 20I is related to the relative angular displacement of the light transmitter 14 and light receiver 18 which produced such relative angular displacement. Accordingly, if the relative angular displacement of the image 20I from the optic plane $P_2$ is measured, the relative angular displacement, or misalignment, of the light transmitter 14 and the light receiver 18 can be determined.

According to the present invention, this measurement is accomplished, in effect, by first translating the boundary image, in its angularly displaced or rotated position, along a direction line normal to the optic plane $P_2$ to a position in which one end of the image bisects its respective sensitive area 32 or 34. The opposite end of the image is then displaced along a direction line substantially parallel to the first-mentioned direction line to a position in which the latter end of the image bisects the other sensitive area. This latter displacement of the image is related to the relative angular displacement of the image from the optic plane $P_2$ and is measured to obtain a readout related to the relative angular displacement of the light transmitter 14 and light receiver 18.

In the instrument illustrated, the above-described displacements of the boundary image 20I are effected as follows: Situated on the optic axis 16 of the objective 12, approximately at the principal focus $f$ of the objective, is an optical tipping plate 42. The tipping axis 44 of this plate is substantially parallel to the common optical plane $P_2$ of the sensitive areas 32 and 34 of the light receiver 18. It is evident that the light rays which travel from the lamp pair 22 through the objective 12 to the sensitive area 34 and the light rays which travel from the lamp pair 24 through the objective to the sensitive area 32 all pass through the optical tipping plate 42. Accordingly, rotation of this tipping plate about its tipping axis 44 displaces the entire image 20I in translation, in the image plane $P_1$, along a direction line normal to the common optical plane $P_2$ of the sensitive areas 32 and 34. This translation of the image shifts the left-hand end of the image, as the latter is viewed in FIG. 5a, across the sensitive area 32. Thus, by appropriately positioning the tipping plate 42 about its axis 44, the left-hand end of the image may be positioned to bisect the sensitive area 32. This area then receives equal amounts of the characteristic light $L_1$ and $L_2$ from the lamps 24a and 24b.

Situated directly in front of the sensitive area 34, in the light path I, is a second optical tipping plate 46 having its tipping axis 48 parallel to the tipping axis 44 of the tipping plate 42. Thus, rotation of the tipping plate 46 displaces the right-hand end of the boundary image 20I, as the latter is viewed in FIG. 6a, in the image plane $P_1$ and along a direction line parallel to the direction line of the image displacement produced by rotation of the optical tipping plate 42. This displacement of the right-hand end of the image occurs across the sensitive area 34 of the light receiver. Accordingly, the right-hand end of the image 20I may be positioned to bisect on the sensitive area 34, and thus cause the latter area to receive equal amounts of the characteristic light $L_1$ and $L_2$ from the lamps 22a and 22b, by appropriately positioning the tipping plate 46 on its tipping axis 48. If the left-hand end of the image 20I is retained in its centered position on the sensitive area 32 of the light receiver while the right-hand end of the image is displaced to its centered position on the sensitive area 34 of the receiver by rotation of the tipping plate 46, the magnitude of such latter displacement is obviously related to the relative angular displacement of the light transmitter 14 and the light receiver 18 from their aligned position. This displacement of the right-hand end of the boundary image, in turn, is related to the angular position or rotation of the optical tipping plate 46. Accordingly, the shaft 50 of the optical tipping plate 46 furnishes an output related to the relative angular displacement, or misalignment, of the light transmitter and receiver. Thus, if the tipping plate shaft 50 is coupled to a suitably calibrated readout device 52, the angular misalignment of the light transmitter and receiver can be read directly from the readout device 52.

According to the preferred practice of the invention, the tipping plates 42 and 46 are positioned automatically and continuously in response to the characteristic light incident on the sensitive areas 32 and 34 of the light receiver 18. This is accomplished as follows: recalling that the light intensities of the lamps 22, 24, fluctuate between maximum and minimum intensity levels, it is evident that each photocell 38 and 40 generates a first fluctuating output signal in response to the characteristic light $L_1$ and a second fluctuating output signal in response to the characteristic light $L_2$. These output signals are 180° out-of-phase. Accordingly, if either photocell receives equal amounts of the light $L_1$ and light $L_2$ as it does when the adjacent end of the boundary image 20I bisects the corresponding sensitive area 32 or 34 of the light receiver 18, the output of the photocell is effectively a D.-C. signal. If either photocell receives more light of either kind $L_1$ or $L_2$, the output of the photocell is a fluctuating signal of reduced amplitude which fluctuates in phase with the fluctuating intensity of the preponderant incident light. The output of the photocell 38 and the output of the photocell 40 are fed to a phase sensitive servo amplifier 54. This amplifier is supplied with a reference frequency from a reference frequency source 56. Amplifier 54 compares the output from the photocell 38 with the reference signal from the reference frequency source 56 and generates, at 58, a first output or error signal when the photocell receives a preponderance of the characteristic light $L_1$, a second error signal when the photocell receives a preponderance of the characteristic light $L_2$, and a null signal when the photocell receives equal amounts of the characteristic light $L_1$ and $L_2$. Similarly, the amplifier 54 compares the output from the photocell 40 with the reference signal from the reference frequency source 56 and generates, at 60, a first error signal when the photocell receives a preponderance of the characteristic light $L_1$, a second error signal when the photocell receives a preponderance of the characteristic light $L_2$, and a null signal when the photocell receives equal amounts of the characteristic light $L_1$ and $L_2$. The signal generated at output 58 of the amplifier 54 is delivered, via a cable 62, to a reversible servomotor 64 for driving the optical tipping plate 42. Similarly, the signal generated at output 60 of the servo amplifier 54 is delivered, via a cable 62, to a reversible servomotor 68 for driving the tipping plate 46. The servo amplifier 54 is designed to control the servomotors 64 and 68 in such manner that the latter continuously position their respective tipping plates 42 and 46 to maintain the left-hand end of the boundary image 20I in its centered or bisecting position on the sensitive area 32 of the receiver and the right-hand end of the image in its centered or bisecting position on the sensitive area 34 of the receiver, as shown in FIG. 6a. Accordingly, the readout device 52 continuously furnishes a reading related to the angular misalignment of the light transmitter 14 and the light receiver 18.

If desired, the shafts of the servomotors 54 and 68 may be provided with knobs (not shown) to permit manual turning of these motors and, thereby, manual positioning of the tipping plates 42 and 46. In this regard, it is evident that the slits 32, 34 of the receiver 18 provide visible reference means which define the optic plane $P_2$ at the receiver and permit the boundary image 20I to be visually positioned as described above and shown in FIGS. 4a, 6a, by manual adjustment of the tipping plates.

As mentioned earlier, a typical application of the present instrument is measuring or monitoring the relative angular position or displacement of two objects. In this application, the light transmitter 14 and the light receiver 18 are operatively connected to the objects (not shown) so that the light transmitter 14 is rotatably positioned with one object and the light receiver 18 is rotatably positioned with the other object. Thus, any relative angular displacement or misalignment of the objects is reflected in a corresponding relative angular displacement of the boundary image 20I from its centered position of FIG. 4a on the sensitive areas 32 and 34 of the light receiver. The instrument is rendered operative in response to this misalignment of the index image and to immediately restore the image to its centered position on the sensitive areas, in the manner described above, thereby generating a relative angular displacement readout on the readout device 52.

It will be immediately evident of those skilled in the art that the light path deflecting functions of the tipping plates 42 and 46 may be accomplished by light deviating or deflecting means other than tipping plates. The function of the tipping plate 42, for example, may be accomplished by rotatably mounting the objective 12 for turning on an axis parallel to the axis of the plate 46.

Clearly, therefore, the invention herein described and illustrated is fully capable of attaining the objects and advantages preliminarily set forth.

While a certain preferred embodiment of the invention has been disclosed for illustrative purposes, numerous modifications in the design, arrangement of parts, and instrumentalities of the invention are possible within the scope of the following claims.

What is claimed is:
1. An optical instrument comprising:
   a single optical objective having an optic axis;
   a light transmitter on said axis including a pair of light sources, means for transmitting light from one source to said objective at one side only of a boundary plane parallel to said axis and transmitting light from the other source to said objective at the opposite side only of said plane, and a boundary element extending transversely of said axis within said plane;
   said objective producing from light from both sources a unitary optical boundary image of said boundary element in an image plane transverse to said axis;
   a light receiver including means in said image plane for receiving and displaying said boundary image and reference means defining the intersection of said image plane with an optic plane parallel to said axis;
   a single first adjustable optical light deflecting means on said axis between said transmitter and receiver for rectilinear deflection of all the lights rays from both sources defining said boundary image in a transverse direction of said optic plane to translate the entire boundary image along a transverse direction line of said optic plane; and
   a single second adjustable optic light deflection means between said transmitter and receiver in the path of only that portion of the light rays from both sources which defines one end of said boundary image for deflecting said portion of the light rays in a direction parallel to said direction line to translate said one end only of said image relative to the other end of said image along a direction line parallel to said first mentioned direction line.

2. An optical instrument according to claim 1 wherein;
   said first optical light deflection means comprises a generally flat transparent optical plate situated on said axis adjacent the focal point of said objective between said objective and said receiver so as to intercept substantially all of the light rays traveling from said transmitter to said receiver, and, means for rotating said plate about an axis extending edgewise through said plate parallel to the side faces of said plate and disposed normal to said optic axis and parallel to said optic plane.

3. An optical instrument according to claim 1 wherein:
   said second optical light deflection means comprises a flat transparent optical plate situated directly in front of said image plane in a position to intercept only those light rays defining said one end of said boundary image; and
   means for rotating the said plate on an axis extending edgewise through said plate and parallel to the side faces of said plate and disposed normal to said optic axis and parallel to said optic plane.

4. An optical instrument according to claim 1 wherein:
   said first optical light deflection means comprises a flat transparent optical plate situated on said axis adjacent the focal point of said objective between said objective and said receiver so as to intercept substantially all of the light rays transmitted from said transmitter to said receiver; and
   means for rotating said plate on an axis extending edgewise through said plate parallel to the side faces of said plate and disposed normal to said optic axis and parallel to said optic plane; and
   said second optical light deflection means comprises a second flat transparent optical plate situated directly before said image plane in a position to intercept only those light rays defining said one end of said boundary image; and
   means for rotating said second plate on an axis extending edgewise through said second plate parallel to the side faces of said second plate and disposed normal to said optic axis and parallel to said optic plane.

5. An optical instrument comprising:
   a single optical objective having an optic axis;
   a light transmitter on said axis including a first light source for emitting characteristic light of one kind, a second light source for emitting characteristic light of another kind;
   means for transmitting light from one source to said objective at one side only of a boundary plane parallel to said axis and transmitting light from the other source to said objective only at the opposite side of said plane; and
   a boundary element extending transversely of said axis within said plane;
   said objective producing from light from both light sources, a unitary optical boundary image of said element in an image plane transverse to said axis, whereby characteristic light of said one kind arrives at the image plane at one side only of said boundary image and characteristic light of said other kind arrives at said image plane at the opposite side only of said boundary image;
   a light sensitive receiver on said axis including a pair of light sensitive areas located at opposite sides of said axis along the intersection of said image plane and an optic plane parallel to said axis; and
   means for sensing the characteristic light incident on each said sensitive area; and
   a single first adjustable optical light deflection means on said axis for rectilinear deflection of all the light rays from both sources defining said boundary image in a direction transverse to said optic plane to translate the entire boundary image along a transverse direction line of said optic plane to a position wherein one end of said image bisects one of said sensitive areas; and a single second adjustable optical light deflection means in the path of only that portion of the light rays from both sources which defines the other end of said boundary image for deflecting said portion of the light rays in a direction parallel to said direction line to translate said other end only of said image relative to said one end of said image along a direction line parallel to said first mentioned direction line and through a position wherein said other end of said image bisects the other sensitive area of said light receiver.

6. An optical instrument according to claim 5 wherein:
said first optical light deflection means comprises a generally flat transparent optical plate situated on said axis adjacent the focal point of said objective between said objective and said receiver so as to intercept substantially all of the light rays traveling from said transmitter to said receiver and, means for rotating said plate about an axis extending edgewise through said plate parallel to the side faces of said plate and disposed normal to said optic axis and parallel to said optic plane.

7. An optical instrument according to claim 5 wherein:
said second optical light deflection means comprises a flat transparent optical plate situated directly in front of said image plane in a position to intercept only those light rays defining said one end of said boundary image; and means for rotating the said plate on an axis extending edgewise through said plate and parallel to the side faces of said plate and disposed normal to said optic axis and parallel to said optic plane.

8. An optical instrument according to claim 5 wherein:
said light receiver comprises first signal generating means for generating a first error signal when said one sensitive area receives a preponderance of characteristic light of said one kind, a second error signal when said one sensitive area receives a preponderance of characteristic light of said other kind, and a null signal when said one sensitive area receives equal amounts of characteristic light of said one kind and said other kind, and second signal generating means for generating a first error signal when said other sensitive area receives a preponderance of characteristic light of said one kind, a second error signal when said other sensitive area receives a preponderance of characteristic light of said other kind, and a null signal when said other area receives equal amounts of characteristic light of said one kind and said other kind;

means coupled to the output of said first signal generating means for positioning said first optical deflection means in response to the signals from said first signal generating means in such a way as to maintain said one end of said boundary image in its bisecting position on said one sensitive area; and means coupled to the output of said second signal generating means for positioning said second optical light deflection means in response to the signals from said second signal generating means in such a way as to maintain said other end of said boundary image in its bisecting position on said other sensitive area.

9. An optical instrument according to claim 5 wherein:
said light transmitter comprises a first alternating current source for energizing said first light source,
a second alternating current source for energizing said second light source, and the current from said sources being 180° out-of-phase, whereby said light sources fluctuate in intensity, and said characteristic light of said one kind and said other kind are characterized by out-of-phase fluctuating intensities;
said light receiver comprises an opaque mask located in said image plane and having a pair of transparent slits along the intersection of said image plane and said optic plane and defining said sensitive areas, respectively, photocells behind said slits, respectively, for receiving light passing through said slits, first signal generating means coupled to the output of one photocell for generating a first error signal when said one photocell receives a preponderance of fluctuating light from one light source, a second error signal when said one photocell receives a preponderance of fluctuating light from the other light source, and a null signal when said one photocell receives equal amounts of light from said light sources, and second signal generating means coupled to the output of the other photocell for generating a first error signal when said other photocell receives a preponderance of fluctuating light from one light source, a second error signal when said other photocell receives a preponderance of fluctuating light from the other light source and a null signal when said other photocell receives equal amounts of fluctuating light from said light sources;
means coupled to the output of said first signal generating means for positioning said first optical deflection means in response to the signals from said first signal generating means in such a way as to maintain one end of said boundary image in a bisecting position on one of said slits; and
means coupled to the output of said second signal generating means for positioning said second optical deflection means in such a way as to maintain the other end of said boundary image in a bisecting position on the other slit of said light receiver.

References Cited by the Examiner

UNITED STATES PATENTS

| | | | |
|---|---|---|---|
| 3,002,419 | 10/1961 | Vyce | 88—1 X |
| 3,055,263 | 9/1962 | Kuehne | 88—1 X |
| 3,116,886 | 1/1964 | Kuehne | 250—231 |
| 3,219,830 | 11/1965 | Sharman et al. | 88—14 |

JEWELL H. PEDERSEN, *Primary Examiner.*

F. SHOON, *Assistant Examiner.*